United States Patent
Park

[11] Patent Number: 5,832,084
[45] Date of Patent: Nov. 3, 1998

[54] RECORDING METHOD OF DIGITAL MAGNETIC RECORDING MEDIUM FOR COPYRIGHT PROTECTION AND VARIABLE SPEED PLAYBACK

[75] Inventor: Tae Joon Park, Seoul, Rep. of Korea

[73] Assignee: LG Electronics, Inc., Japan

[21] Appl. No.: 583,400

[22] Filed: Jan. 5, 1996

[30] Foreign Application Priority Data

Nov. 10, 1995 [KR] Rep. of Korea ................. 40634/1995

[51] Int. Cl.⁶ .............................................. H04N 7/167
[52] U.S. Cl. ............................................. 380/5; 380/10
[58] Field of Search ................................ 380/10, 5

[56] References Cited

U.S. PATENT DOCUMENTS

5,546,461  8/1996  Ibaraki et al. ............................. 380/20
5,600,721  2/1997  Kitazato .................................... 380/10

Primary Examiner—Stephen C. Buczinski
Attorney, Agent, or Firm—John P. White; Cooper & Dunham LLP

[57] ABSTRACT

In a recording method of a digital magnetic recording medium for a copyright protection and a variable speed playback when a user records a digital broadcasting program by a digital video cassette recorder (DVCR) or variable speed playback of a rental tape while performing a copyright protection function, a video track of a video tape is separated into a scrambled data region where scrambled data is recorded and a descrambling region where descrambling information for descrambling the scrambled data is recorded to record the video data on the corresponding region. When this method is adopted with a proper copyright protection system, the copyright of the program provider can be protected, and the lowering of the performance is also minimized during the user's variable speed playback of the video tape to which the copyright protection function is adopted, thereby satisfying both the program provider and the user.

19 Claims, 9 Drawing Sheets

RECORDING METHOD OF DIGITAL MAGNETIC RECORDING MEDIUM FOR COPYRIGHT PROTECTION AND VARIABLE SPEED PLAYBACK

BACKGROUND OF THE INVENTION

The present invention relates to a recording method of a digital magnetic recording medium, and more particularly, to a recording method of a digital magnetic recording medium for copyright protection and variable speed playback when a user records a digital broadcasting program by a digital video cassette recorder (DVCR) or variable speed playback of a rental tape while performing a copyright protection function.

In general, the digital data recorded onto a digital recording medium such as DVCR is compressed in such a method as an MPEG-2. Therefore, data quantity that a frame occupies varies depending on a frame type, i.e., I-frame, P-frame or B-frame. Also, since the position where each frame is recorded in a tape is random, the DVCR cannot attain a variable playback like in an analog VCR adopting a conventional VHS method.

Accordingly, various methods for implementing a variable speed playback in the DVCR recording medium are under examination. Among them, one is a variable speed playback by which a normal speed playback and a super-high speed playback are alternately repeated.

Figure 1:
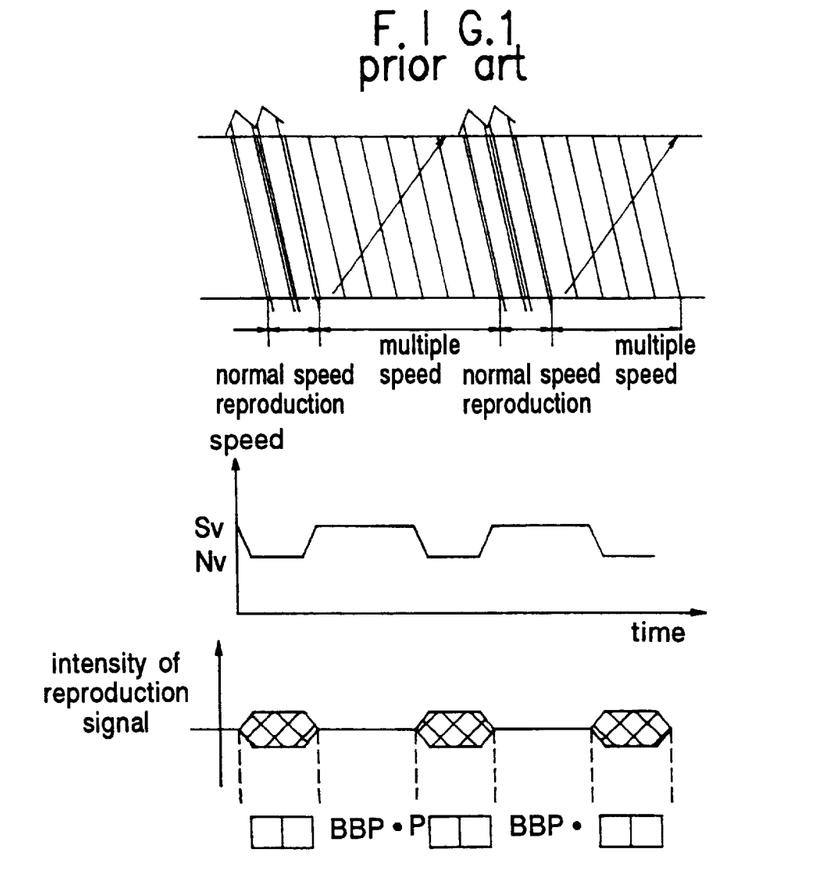
FIG. 1 illustrates a variable speed playback using a conventional digital recording medium.

FIG. 1 illustrates a variable speed playback using a conventional digital recording medium.

Referring to FIG. 1, if a video tape travels in a normal speed ($N_v$), a video head reproduces data on a track. If a video tape travels in a super-high speed ($S_v$), a video head does not reproduce data but travels the tape in a super-high speed mode.

In this case, the playback time and a super-high speed time are controlled to determine an average number of multiple speed. In other words, the larger the super-high speed playback time than the normal playback time, the more the average number of multiple speed.

At this time, if the intensity of a playback signal is properly controlled so as to be positioned in an I-frame corresponding to the block where stable data restoration is allowed during a normal playback, since the I-frame restores a screen with the information of its own, data of one frame portion can be displayed in a normal speed playback block. In this case, since the frame displayed in a super-high multiple speed block is maintained, variable speed playback allows a faster tape travelling than the normal speed playback while the screen is displayed slowly without deterioration of a picture quality.

There have been proposed several methods for protecting copyrights for digital magnetic recording media, that is, a Serial Copy Management System (SCMS) for audio media such as audio tapes or mini disks and an Intellectual Property Protection System (IPPS) for digital VCRs and digital video discs.

IPPS is disclosed in U.S. Pat. No. 5,315,448, in which several bits of a transmission header portion of a digital compression standard, e.g., MPEG, which is widely used, or several bits of a recording header portion are used as a controlling flag for controlling copyright protection without changing compressed data.

However, these methods adopt a simple manipulation of flags without changing data. Thus, if a hacker intercepts these flags to be modulated, the copyright protection is easily infringed to lower the secrecy of the copyright.

Also, since a controlling flag should be searched to be reproduced during a normal speed playback while searching an I-frame, the variable speed playback cannot exhibit satisfiable performance.

SUMMARY OF THE INVENTION

To solve the above problems, it is an object of the present invention to provide a recording method of a digital magnetic recording medium for copyright protection and variable speed playback.

To accomplish the above object, according to the present invention, there is provided a recording method of a digital magnetic recording medium for copyright protection and variable speed playback wherein a video track of a video tape is separated into a scrambled data region, where scrambled video data (SD) is recorded, and a descrambling region where a descrambling information (DI) for descrambling the SD is recorded, to record the video data on the corresponding region.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 2:
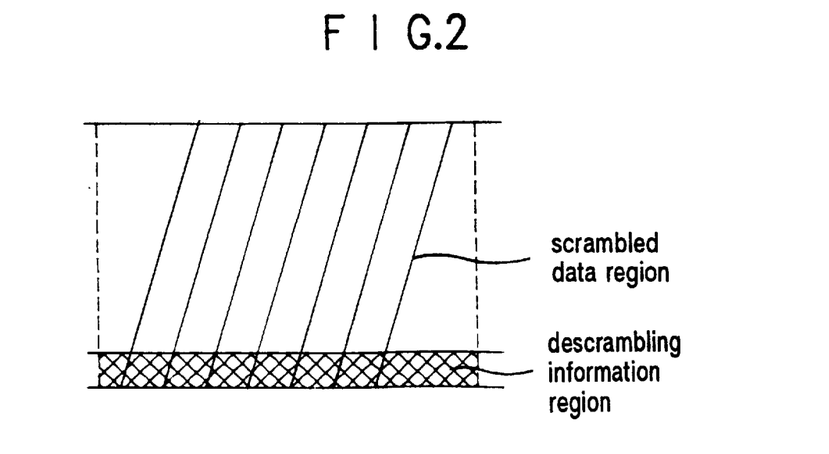
FIG. 2 shows an embodiment of a recording data format of a video tape according to the present invention.

As shown in FIG. 2, the recording method of a digital magnetic recording medium for copyright protection and variable speed playback according to the present invention is to separate a video track of a video tape into a scrambled data region and a descrambling information region for recording.

In other words, the scrambled video data (SD) which is not easily descrambled by a simple manipulation is recorded in the scrambled data region to maintain the secrecy of copyright protection.

Also, the descrambling information for descrambling the scrambled data is recorded in the descrambling information region.

In other words, as shown in FIG. 2, since the scrambled data region and the descrambling information region are allotted for each track of a video tape, the descrambling information can be detected all the time even if the variable speed playback mode is converted into a normal speed playback mode at any position of the video tape. Thus, the variable speed playback can be stably performed with the video tape having the scrambled data recorded thereon.

At this time, it is preferable that the scrambled data is scrambled depending on the scrambling information varied in a constant time interval and the descrambling information is varied depending on the scrambled video data in a constant time interval, i.e. 0.5 second interval, and more preferably 3~30 second interval.

That is to say, scrambled data SD(n) is scrambled depending on the scrambled data corresponding to the scrambled block separated by a cycle during which the scrambling information is initialized. Descrambling information DI is varied depending on the scrambled block in a constant time interval, i.e., 0.5 second interval.

In other words, the constant time during which the descrambling information DI(n) is not varied corresponds to a scrambled unit separated by a cycle during which the scrambled information is initialized during scrambling, that is, the scrambled block from data coming first after initialization to the data coming right before the next initialization.

The scrambling information for scrambling video data is later used as the descrambling information for descrambling the scrambled data. In order to maintain the secrecy of copyright protection, the video data is scrambled by varying the thus-scrambled information in a constant time interval, i.e., 0.5 second interval, corresponding to the scrambled block, and the descrambling information for descrambling the scrambled data is also varied in a constant time interval, i.e., 0.5 second interval.

In other words, the size of a scrambled block is multiplied by a constant (N) times the scrambled data SD(n) of a track portion to supervise the descrambling information DI(n) corresponding to the scrambled block in the unit of tracks.

Therefore, the descrambling information DI is repeatedly recorded depending to the quantity (N) of tracks corresponding to the scrambled block.

In the variable speed playback, it is important to restore as much information as possible during a constant speed playback block. However, since the video data recorded onto a video tape is scrambled, the descrambling for display is allowed only when the scrambled data SD and the descrambling information DI exist together. Thus, the restoration efficiency of data which can be displayed in the constant speed block during the variable speed playback is lowered, compared with that during playback of the unscrambled data. Also, in case of recording scrambled data SD onto the video tape, the playback performance by speed variation becomes poor due to the inappropriate method for recording the information needed for scrambling, which may causes considerable inconvenience to a user.

The copyright protection system suffices the request of a program provider (PP) who desires a program copyright strongly, but restricts the program viewing right of legal users. Thus, there is need for a method for avoiding or minimizing a lowered performance due to the copyright protection during variable speed playback.

An example of the lowered performance is an erasure of an overall scrambled block when the descrambling information is not reproduced at an initial normal playback block during the variable speed playback, in case of a larger scrambled block.

In order to solve the above problem, the descrambling information DI leads the track on which the scrambling data SD(n) is recorded by a constant number (P) of tracks, to then be repeatedly recorded for descrambling the corresponding scrambled data SD(n) according to the quantity of tracks corresponding to the scrambled block.

Here, the descrambling information DI used equally for the tracks corresponding to the scrambled block is repeatedly recorded for descrambling the scrambled data using the equal descrambling information by a constant number (P) of tracks, ahead by the constant number (P) of tracks.

Figure 3:
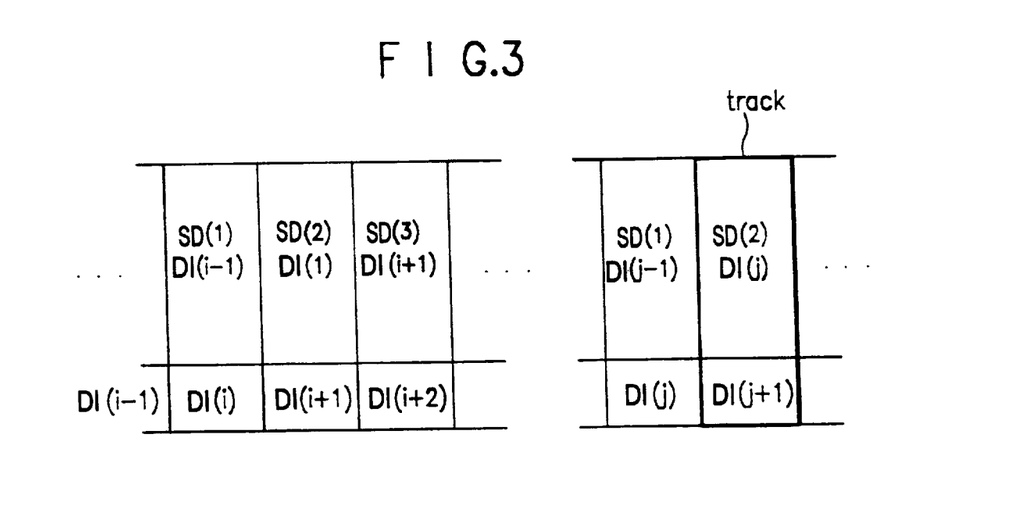
FIG. 3 shows a first embodiment of a detailed a recording data format shown in FIG. 2.

Particularly, if an encryption is not necessary as the descrambling information DI is recorded onto a video tape without encryption, the corresponding scrambled data SD is recorded ahead of the scrambled data by a track and is then read for descrambling the same, thereby preparing to descramble the scrambled data to be read in the next track, as shown in FIG. 3.

In other words, the scrambled data to be read in the next track for facilitating the descrambling and display is descrambled by the descrambling information DI read from the previous track from the point of reading time.

As shown in FIG. 3, the scrambled data SD(1) is recorded on the descrambling information region of a track coming ahead of the descrambling information DI(i−1) by a track, the scrambled data SD(2) is recorded on the descrambling information region of a track coming ahead of the descrambling information DI(i) by a track, and the scrambled data SD(3) is recorded on the descrambling information region of a track coming ahead of the descrambling information DI(i+1) by a track.

In this manner, if the descrambling information DI corresponding to the scrambled data SD is recorded ahead by a track, the minimum restoration unit is made to be two tracks during the variable speed playback, thereby minimizing the lowering of the playback performance due to the speed variation.

Also, if the descrambling information DI is encrypted to then be recorded, the descrambling information DI is recorded ahead of the track where the scrambled data SD is recorded by tracks (P) corresponding to the time for decryption of the descrambling information DI.

Figure 4:
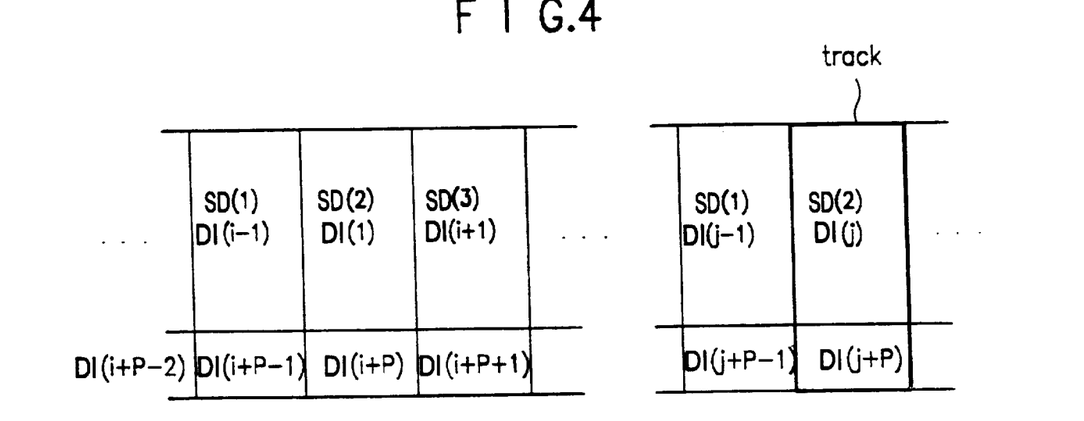
FIG. 4 shows a second embodiment of a detailed a recording data format shown in FIG. 2.

In other words, as shown in FIG. 4, the scrambled data SD(l) is recorded on the descrambling information region of a track (i−P−1) coming ahead of the descrambling information DI(i−1) by P tracks, the scrambled data SD(2) is recorded on the descrambling information region of a track (i−P) coming ahead of the descrambling information DI(i) by P tracks, and the scrambled data SD(3) is recorded on the descrambling information region of a track (i−P+1) coming ahead of the descrambling information DI(i+1) by P tracks.

Therefore, the descrambling information DI(i+P−1) for descrambling the scrambled data SD(1+P) to be read after P tracks is recorded in the descrambling information region of the track where the scrambled data SD(1) is recorded, the descrambling information DI(i+P) for descrambling the scrambled data SD(2+P) to be read after P tracks is recorded in the descrambling information region of the track where the scrambled data SD(2) is recorded, and the descrambling information DI(i+P+1) for descrambling the scrambled data SD(3+P) to be read after P tracks is recorded in the descrambling information region of the track where the scrambled data SD(3) is recorded.

Figure 5:
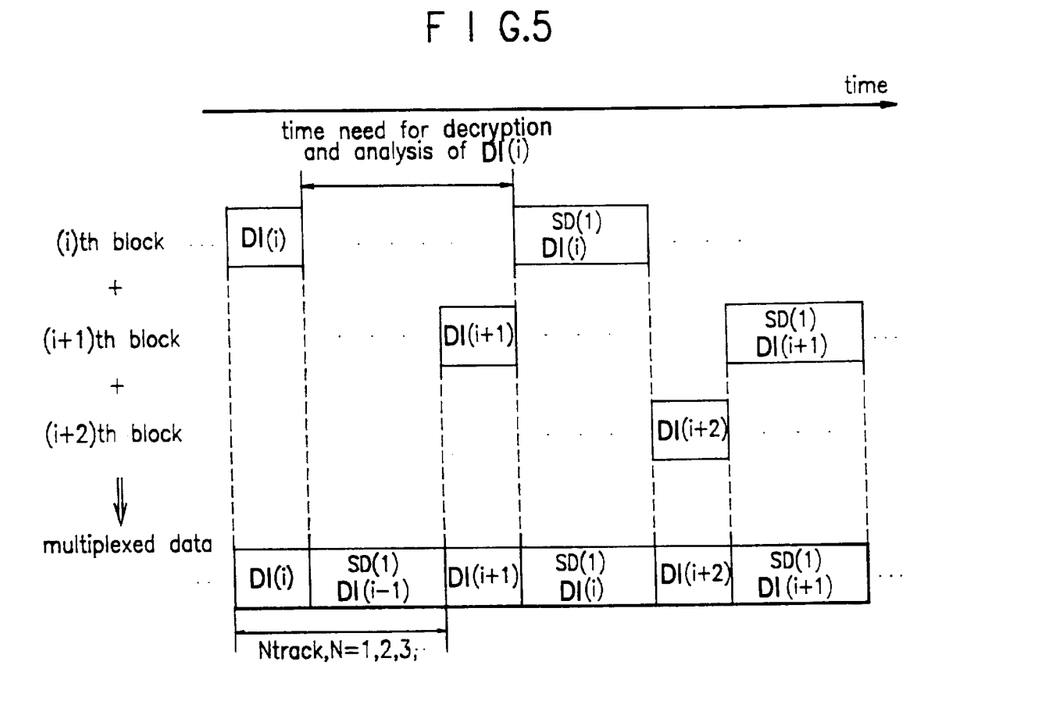
FIG. 5 illustrates a multiplexing process over time in FIG. 3.

In order to record the scrambled data SD scrambled in such formats and the corresponding descrambling information DI onto a video tape, as shown in FIG. 5, the descrambling information DI and the scrambled data SD are multiplexed.

In other words, the descrambling information DI is present ahead of the scrambled data SD by the time corresponding to P tracks. The time between the descrambling information DI and the scrambled data SD is necessary for performing a decryption for an encrypted descrambling information DI and analyzing the descrambling information DI in a copyright protection system.

Figure 6:
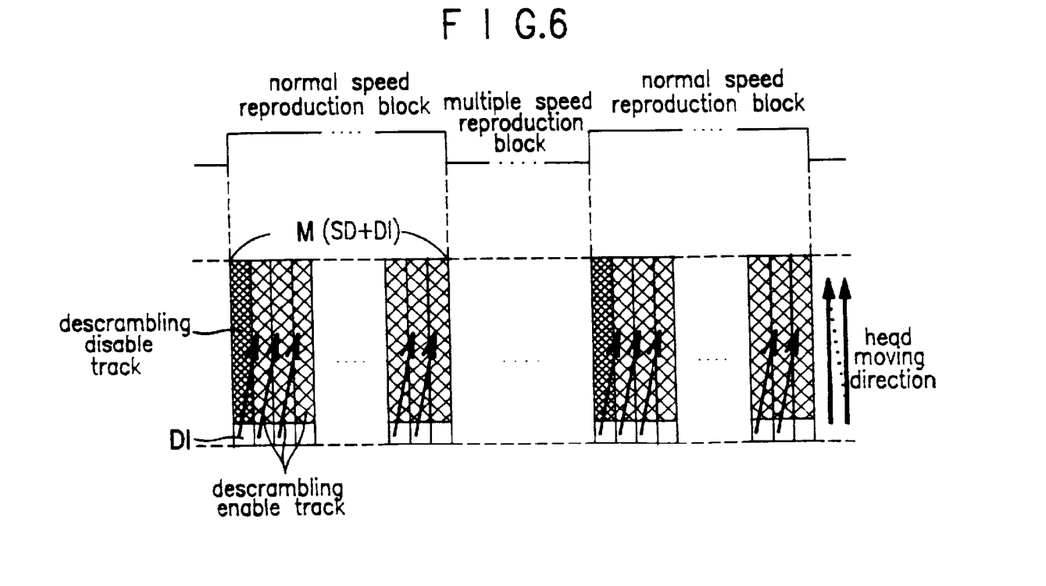
FIG. 6 illustrates a variable speed playback in FIG. 2.

In case of recording the scrambled data SD scrambled in such formats and the corresponding descrambling information DI onto a video tape for a variable speed playback, as shown in FIG. 6, the scrambled video data SD coming first after entering the normal speed playback block cannot be descrambled as the descrambling information DI corresponding thereto is not restored. Thus, the data quantity of P tracks is lost due to the recording of the scrambled data and it is proper to set P track as "1" to minimize the loss.

In other words, after reading the descrambling information DI during the normal speed playback block, since the scrambled data corresponding to the next descrambling information is read and then descrambled to be displayed, it is not possible to reproduce the scrambled data corresponding to the track recorded ahead of the descrambling information DI and the corresponding scrambled data SD.

Thus, the less the tracks between the descrambling information DI and the corresponding scrambled data SD (i.e., recording leads ahead by one track), the higher the variable speed playback efficiency.

However, since the descrambling information DI is encrypted for copyright protection, the descrambling information DI should be recorded ahead of a track where the scrambled data SD is recorded only the portion corresponding to the minimum time needed for decryption.

Therefore, in case of playback of M tracks in the normal speed playback, since the descrambling information DI is reproduced first and then the corresponding scrambled data SD is reproduced for being descrambled to allow a display, the loss corresponding to the portion where the scrambled information DI is recorded ahead, i.e., corresponding to the previous P track.

Figure 7:
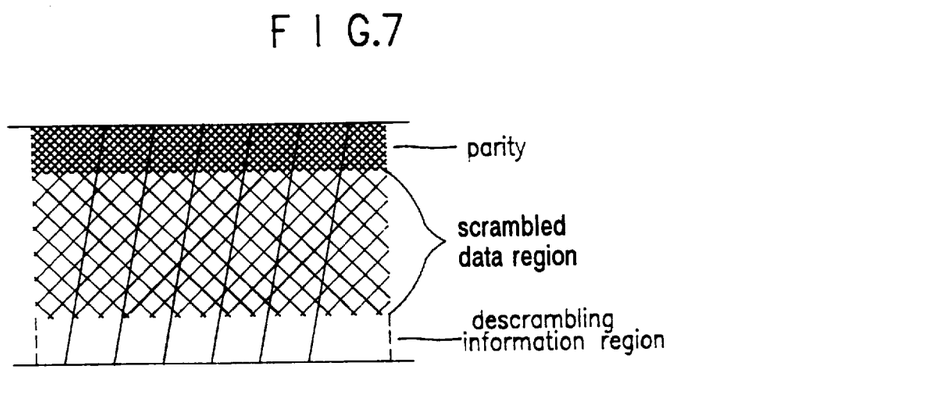
FIG. 7 shows a third embodiment of a detailed a recording data format shown in FIG. 2.

The same parity for error correction as that of the scrambled data SD is added to the descrambling information DI. As shown in FIG. 7, for error correction of the scrambled data SD and descrambling information DI, a parity region for recording a parity is added in the video track of a video tape.

In other words, since the scrambled data SD recorded in the scrambled data region is protected by an error correcting code, i.e., the parity, the error probability after correction is less than $1 \times 10^{-11}$, which is satisfactory performance.

However, if errors occur to the descrambling information DI, the scrambled data corresponding thereto is also in error, which lowers the performance in view of the overall error probability.

Also, in case of playback of the scrambled data to which the parity is added for error correction, if the same parity is not added to the descrambling information as that of the scrambled data, the data read from a header is separately processed, thereby making it difficult to process scrambled video data.

Therefore, the same parity for error correction as that of the scrambled data SD is added to the descrambling information DI, thereby achieving the same error probability in the descrambling information DI and in the scrambled data SD.

The thus-added parity is recorded in the parity region allotted to the video track of a video tape, as shown in FIG. 7.

The scrambled data region, descrambling information region and parity region are repeated separated in a video track for recording, as shown in FIGS. 8, 9, 10 and 11.

Figure 8A:
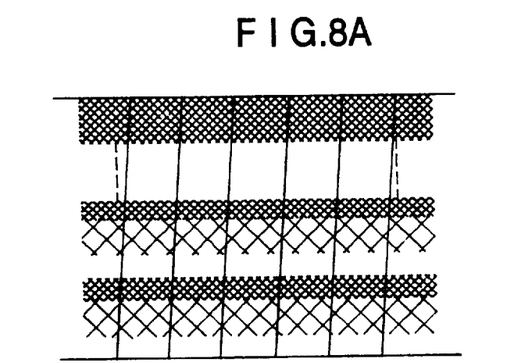
FIGS. 8A and 8B show a first detailed embodiment of FIG. 7.

In other words, as shown in FIG. 8A, the parity is recorded by adding the parity region for recording the parity within a video track of a video tape for error correction of the descrambling information DI. The scrambled data region, descrambling information region and parity region are repeatedly separated and recorded in a video track.

Figure 8B:
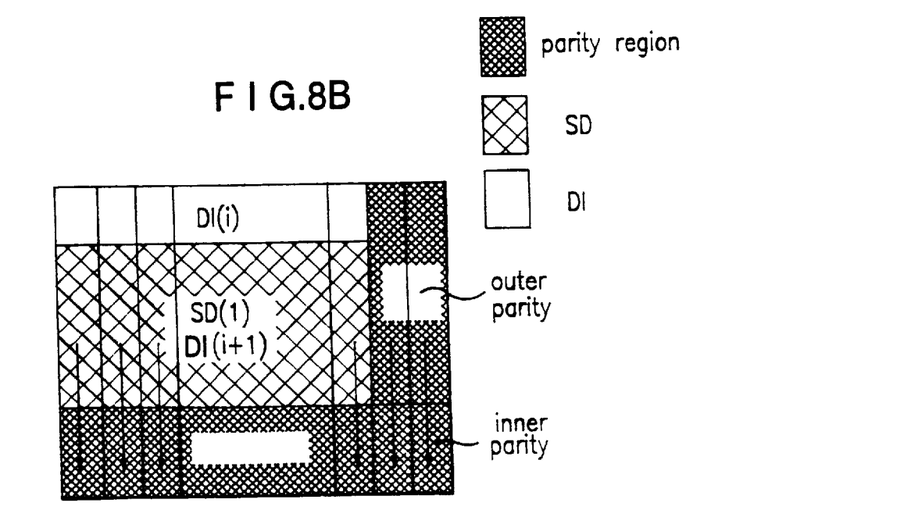

Here, as shown in FIG. 8B, the same parity for error correction as that of the scrambled data SD is added to the descrambling information DI.

In other words, an inner parity and an outer parity are interleaved to the descrambling information DI and the scrambled data SD, as shown in FIG. 8B, to allow error correction.

Each outer parity is interleaved to the descrambling information DI and the scrambled data SD, and an inner parity is inclusively interleaved to the descrambling information DI and scrambled data SD, to allow error correction.

At this time, the descrambling information DI, the scrambled data SD, the inner parity and the outer parity are transmitted horizontally to then be interleaved and are then read in the vertical arrow direction to then be recorded with the video track of the video tape. Thus, as shown in FIG. 8A, the scrambled data region, descrambling information region and parity region are repeatedly separated and recorded with one video track.

Figure 9A:
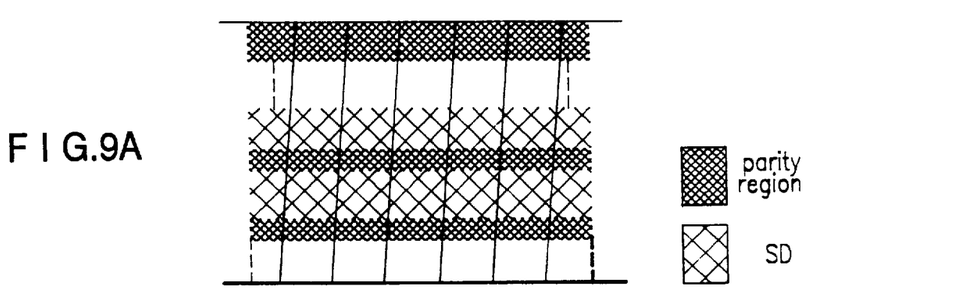
FIGS. 9A and 9B show a second detailed embodiment of FIG. 7.
Figure 9B:
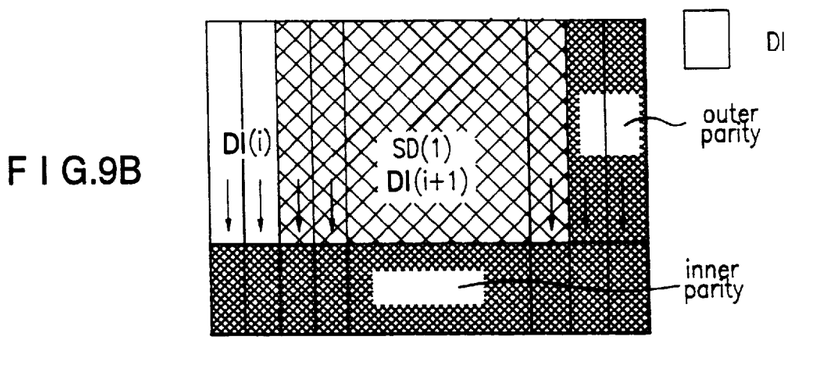

Also, as shown in FIGS. 9A and 9B, the scrambled data is transmitted in the bit stream unit to be recorded. A synchronizing byte present in the bit stream of the transmitted scrambled data is deleted and the descrambling information DI is recorded in the portion corresponding to the synchronizing byte. Here the synchronizing byte is a synchronizing signal.

In other words, as shown in FIG. 9B, if the scrambled data is transmitted in the bit stream unit, the synchronizing byte corresponding to the first byte of the transmitted bit streams is deleted and then the transmitted descrambling information DI is interleaved in the portion to be place in front of the scrambled data.

That is to say, as shown in FIG. 9B, since the scrambled data SD is transmitted horizontally for being interleaved, the descrambling information DI is interleaved to the portion corresponding to the first byte, i.e., the synchronizing byte. Thereafter, an outer parity is inclusively interleaved to the descrambling information DI and the scrambled data SD and each inner parity is interleaved to the descrambling information DI and the scrambled data SD, thereby allowing error correction.

At this time, the descrambling information DI, the scrambled data SD, the inner parity and the outer parity are transmitted horizontally to then be interleaved and are then read in the vertical arrow direction to then be recorded with the video track of the video tape. Thus, as shown in FIG. 9A, the scrambled data region, descrambling information region and parity region are repeatedly separated and recorded within one video track.

In such a manner, since the descrambling information DI is recorded in the synchronizing byte, i.e., the first byte of the scrambled data SD, the video tape, i.e., the video track, is fulled utilized, thereby increasing the capacity of data recorded on the video track.

The parity interleaving method shown in FIGS. 8 and 9 allowing the protection of the descrambling information DI and the scrambled data SD by the same error correcting code, ensures that the scrambled data SD and the descrambling information DI have the same error probability.

Figure 10A:
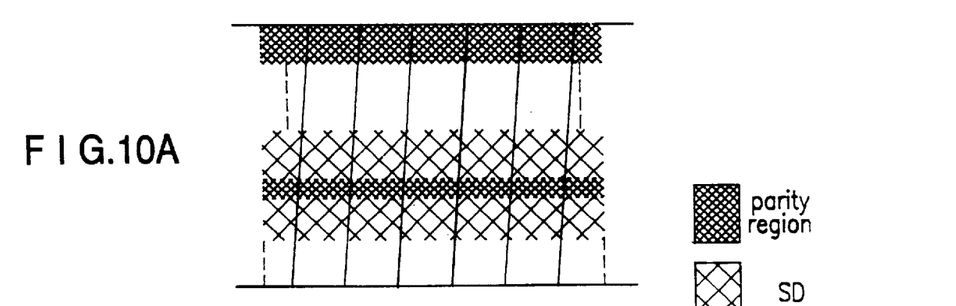
FIGS. 10A and 10B show a third detailed embodiment of FIG. 7.
Figure 10B:
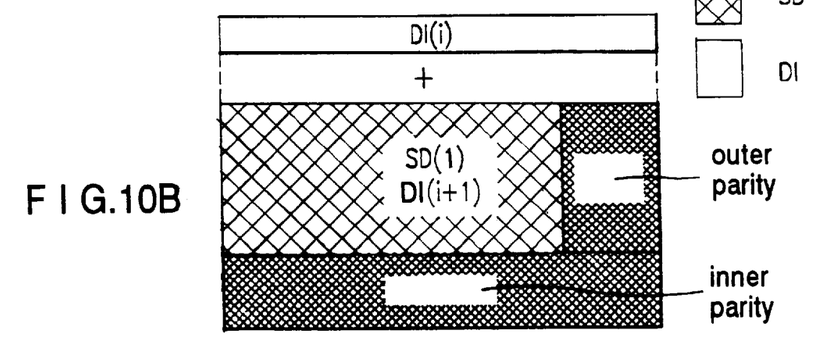

Also, as shown in FIG. 10, the parity is recorded by adding the parity region for recording the parity within a video track of a video tape for error correction of the scrambled data.

In other words, an outer parity and an inner parity are interleaved only to the scrambled data SD.

At this time, since the descrambling information DI is repeatedly recorded depending on the quantity of tracks corresponding to the scrambled block, no parity is added thereto, as shown in FIG. 10B, to then be recorded.

As described above, since the descrambling information DI is repeatedly recorded, the descrambling information DI of adjacent tracks is detected and compared to determine the error feasibility thereof, and then the scrambled data SD is descrambled.

At this time, the scrambled data SD, the inner parity and the outer parity are transmitted horizontally to then be interleaved and are then read vertically to then be recorded with the video track of the video tape. However, the descrambling information DI is separately recorded in the descrambling information region of the video track. Thus, the scrambled data region and the parity region are repeatedly separated and recorded within one video track, but only a single descrambling information is present separately.

According to the parity interleaving method shown in FIG. 10, the descrambling information DI is not protected by the error correcting code for the scrambled data.

Figure 11A:
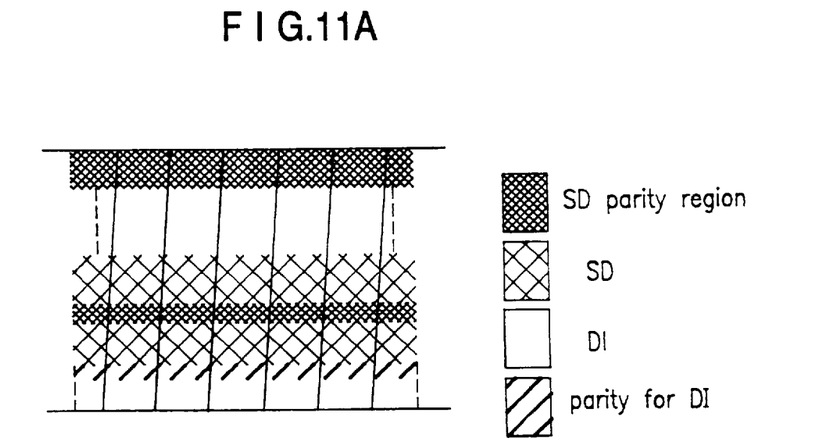
FIGS. 11A and 11B show a fourth detailed embodiment of FIG. 7.
Figure 11B:
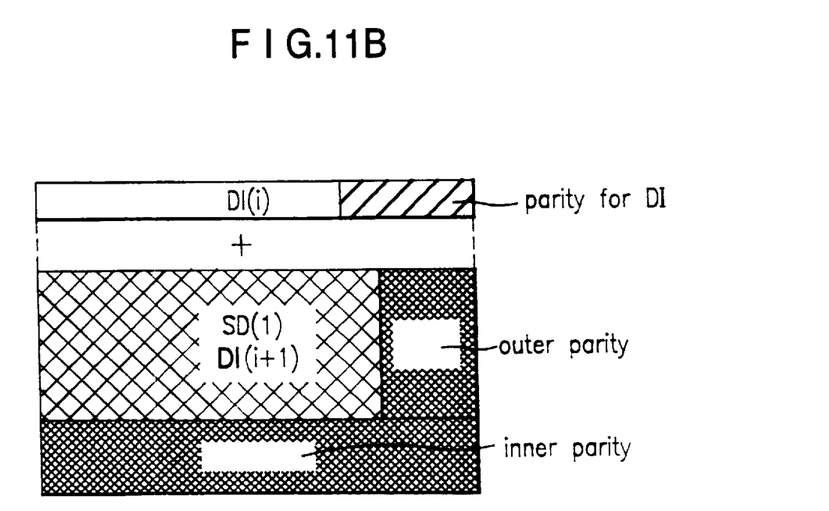

Also, as shown in FIG. 11, the parity of the descrambling information DI is recorded by adding the descrambling parity region for recording the parity of the descrambling information DI within the video track of a video tape for error correction of the descrambling information. The parity of the scrambled data SD is recorded by adding the scrambled parity region for recording the parity of the scrambled data SD within the video track of a video tape for error correction of the scrambled data.

In other words, as shown in FIG. 11B, a separate parity is added to the descrambling information DI to record the parity thereof in a separate descrambling parity region within the video track to allow error correction of the descrambling information DI. The outer parity and inner parity are interleaved to the scrambled data SD to allow error correction thereof.

Here, a different parity from that of the scrambled data SD is added to the descrambling information DI for error correction thereof.

In other words, the parity allowing different error correction from that of the scrambled data SD is interleaved to the descrambling information DI.

At this time, the scrambled data SD, the inner parity and the outer parity are transmitted horizontally to then be interleaved and are then read vertically to then be recorded with the video track of the video tape. However, the descrambling information DI and the parity thereof are separately recorded in the video track. Thus, the scrambled data region and the parity region thereof are repeatedly separated and recorded within one video track, but the descrambling information region and the parity region thereof are separately recorded in one video track.

According to the parity interleaving method shown in FIG. 11, the descrambling information DI is protected by the different error correcting code from that for the scrambled data, i.e., a Bose-Chaudhuri-Hoquenghem (BCH) code.

According to the parity interleaving method shown in FIGS. 10 and 11, error correction is allowed using the fact that the same descrambling information DI is repeatedly recorded for several tracks. Therefore, this method can reduce the quantity of the total parities needed for error correction, in contrast with the parity interleaving method shown in FIGS. 8 and 9.

The parity interleaving method shown in FIGS. 8, 9, 10 and 11 is used with the recording data format shown in FIGS. 3 and 4.

If the data recorded in a video tape in the above method is transmitted to an external device with respect to the DVCR, i.e., a decoder or another DVCR, the transmission data format is as shown in FIGS. 12, 13, 14 and 15.

The external transmission format of the DVCR is not performed by the simple data but is divided into scrambled data SD and descrambling information DI, each recorded onto a video tape, to be output.

At this time, if data is input from the DVCR to the decoder, the transmission data format is performed such that the descrambler within the decoder receives the scrambled data SD and descrambling information DI to be descrambled. If data is input from the decoder to the DVCR, the information concerning the copyright protection is filtered from the descrambling information DI of the transmitted data, satisfying the conditions under which the data can be recorded onto the video tape in the format shown in FIGS. 3 and 4.

Figure 12:
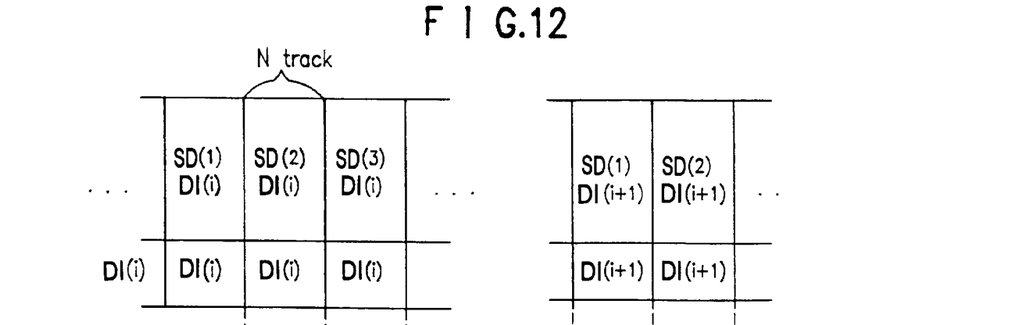
FIG. 12 shows a first embodiment of an external transmission format from a DVCR in FIG. 2.

The transmission format of DVCR shown in FIG. 12 for repeatedly recording the descrambling information DI by the scrambled block is to transmit the scrambled data SD and the descrambling information DI straightly.

Figure 13:
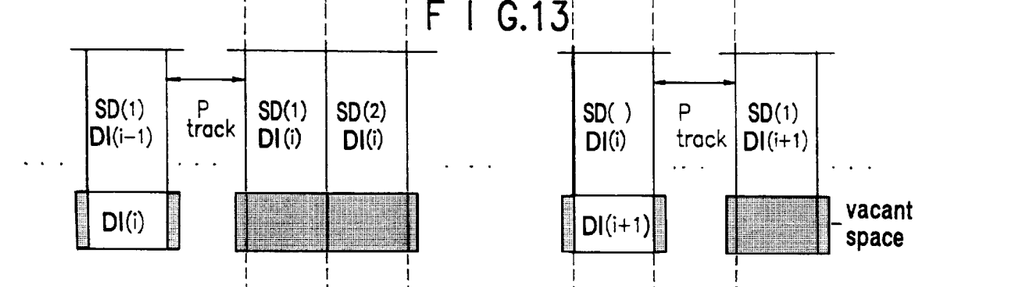
FIG. 13 shows a second embodiment of an external transmission format from a DVCR in FIG. 2.

The transmission format of DVCR shown in FIG. 13 is to remove all kinds of the descrambling information DI with only one kind of descrambling information DI left, when the same descrambling information DI is repeatedly recorded. In other words, in the transmission format of DVCR shown in FIG. 13, the remaining descrambling information DI is removed only to remove the redundancy of the descrambling information with only one kind of descrambling information DI left in the scrambled block, which does not affect the descrambling in the decoder. The descrambling information DI received from another DVCR is repeatedly recorded in the initial recording format and the transmission quantity is reduced.

Figure 14:
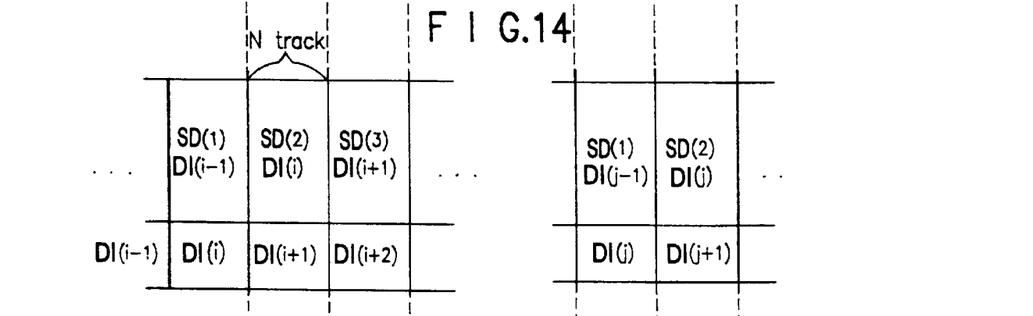
FIG. 14 shows a third embodiment of an external transmission format from a DVCR in FIG. 2.

The transmission format of DVCR shown in FIG. 14 is to transmit data in the same recording format as that shown in FIG. 3.

The transmission format of DVCR shown in FIGS. 12 and 14 can be adopted for straightly outputting the data recorded into the video tape or outputting in the same format of data recorded by selectively decrypting the descrambling information DI when the descrambling information DI is encrypted.

Figure 15:
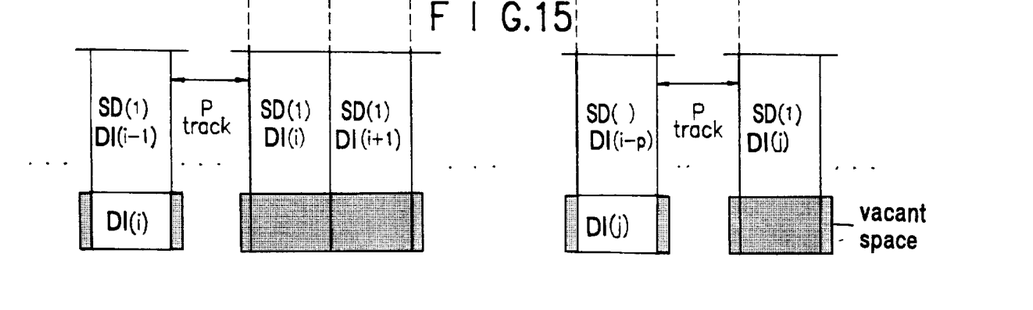
FIG. 15 shows a fourth embodiment of an external transmission format from a DVCR in FIG. 2.

The transmission format of DVCR shown in FIG. 15 which can be adopted in correspondence with the recording data format shown in FIG. 4 transmits only parts of descrambling information DI from the descrambling information recorded onto the video tape. In this case, the decoder or another DVCR requires means for restoring descrambling information from the received descrambling information perfectly.

In other words, in case of using the transmission format of DVCR shown in FIG. 15, there is provided a descrambling information restoring means to restore the perfect descrambling information from the transmitted data and then to descramble the same in each decoder to perform the recording.

A scrambler or descrambler optimally operates when it is designed to be suitable for the format shown in FIG. 4. However, when the data for a conditional access is scrambled and a control word (CW), i.e., the descrambling information DI, needed for descrambling the scrambled data is contained in an entitlement control message (ECM) to be transmitted in a broadcasting station, if the update of the control word is not identical with the data unit of N track portion of the video tape corresponding to the scrambling block, a scrambled algorithm is difficult to adopt the format shown in FIG. 4.

Figure 16:
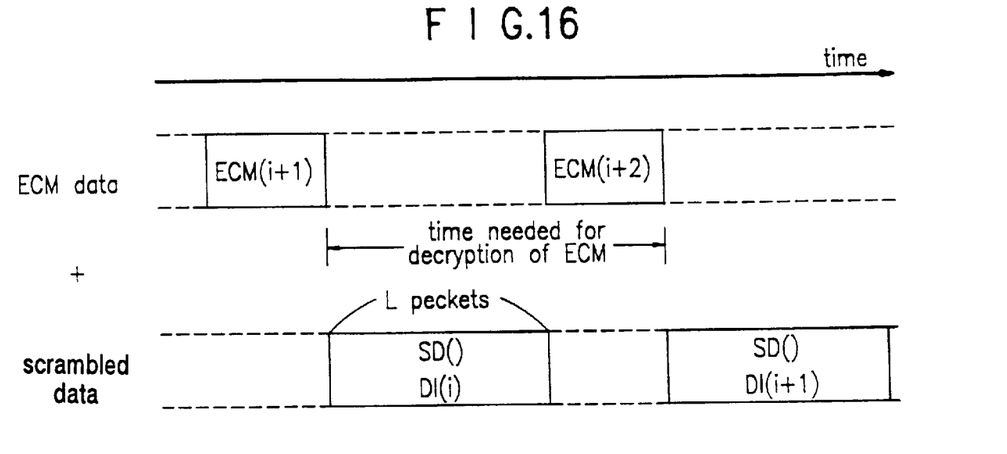
FIG. 16 shows a transmission format between a decoder of a broadcasting program and a DVCR in FIG. 2.
Figure 17:
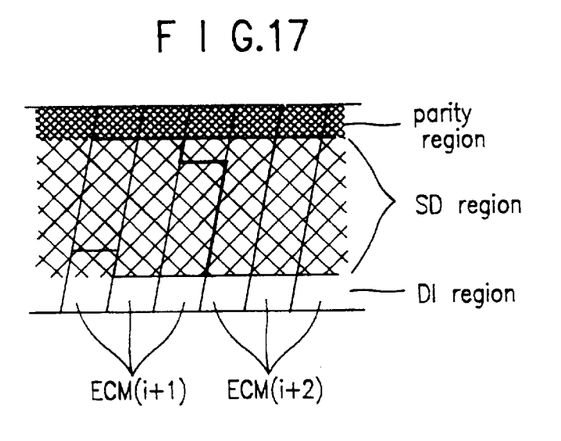
FIG. 17 shows a first embodiment of a recording format of a broadcasting program in FIG. 16.
Figure 18:
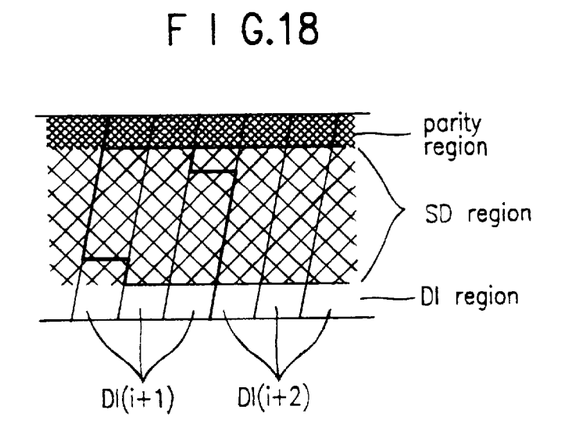
FIG. 18 shows a second embodiment of a recording format of a broadcasting program in FIG. 16.

In such a case, when the broadcasting program is transmitted from decoder to DVCR, if the scrambled data SD and the ECM are transmitted together as shown in FIG. 16, the recording format of the broadcasting program is as shown in FIGS. 17 and 18.

In other words, for a conditional access in a broadcasting station, the descrambling information DI is contained in the ECM to be transmitted and is delayed by the time needed for decrypting the encrypted ECM, and then the scrambled data SD corresponding to the CW contained in the ECM, i.e., the descrambling information DI, as shown in FIG. 16.

As described above, when the descrambling information DI is contained in the ECM to be transmitted, the ECM is recorded in the descrambling information region, as shown in FIG. 17. Thereafter, the ECM is decrypted and then descrambles the corresponding scrambled data using the internal descrambling information DI.

At this time, since the ECM recorded in an encryption state is recorded ahead of the track where the scrambled data SD is recorded by the track corresponding to the time needed for decrypting the ECM for descrambling the next recorded scrambled data SD.

Also, the ECM may be repeatedly recorded depending on the quantity of the track corresponding to the scrambled block or may be recorded once in one track among the tracks corresponding to the scrambled block.

The format shown in FIG. 17 will now be described in detail. Since the cycle for updating the descrambling information DI is not constant, one scrambled block generally starts and ends in the middle of tracks. Therefore, as shown in FIG. 17, the current ECM is repeated until a new ECM is input to then be recorded in the descrambling information region of tracks.

Also, the ECM containing the descrambling information DI is not recorded in the descrambling information region in its encryption state and the control word corresponding to the descrambling information obtained by decrypting the ECM is repeatedly recorded in the descrambling information region. In other words, the descrambling information DI is recorded in the descrambling information region in the state where it is not encrypted.

In this manner, the method of recording the ECM onto a video tape after decrypting the ECM does not require the decryption of the ECM during playback of the video tape, thereby facilitating the scrambled process, and records the CW clearly, thereby lowering the secrecy.

Figure 19:
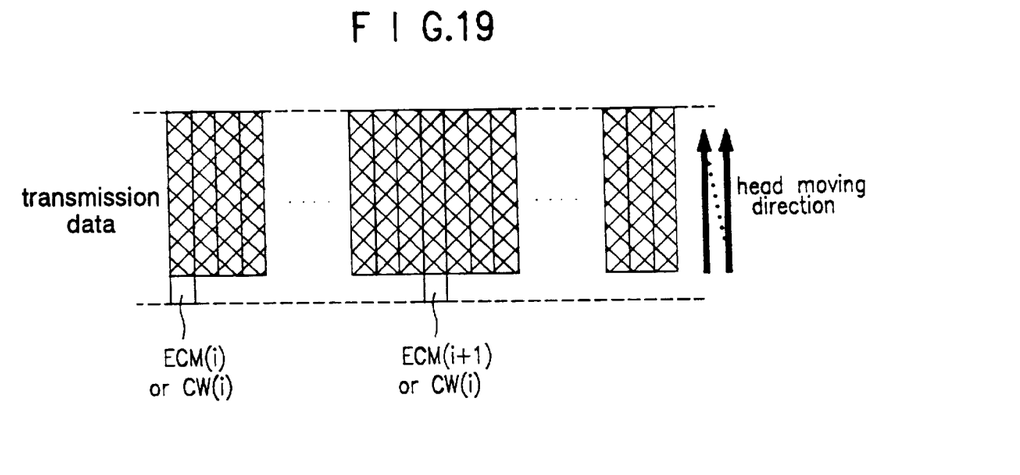
FIG. 19 illustrates a normal speed playback shown in FIGS. 17 and 18.
Figure 20:
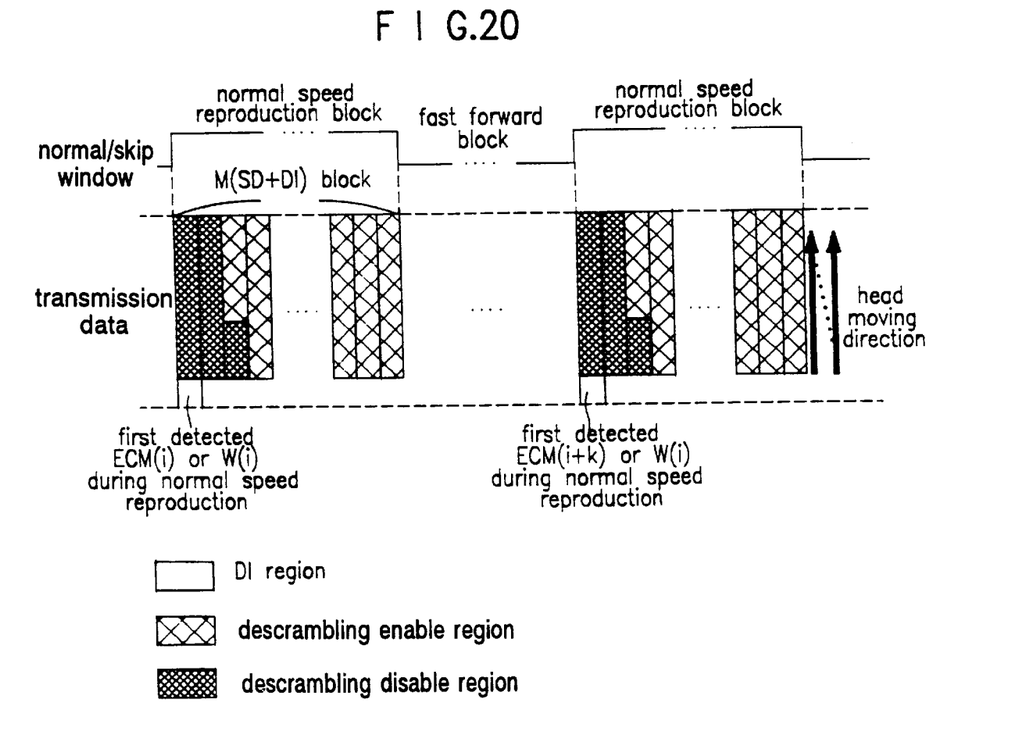
FIG. 20 illustrates a variable speed playback shown in FIGS. 17 and 18.

If the broadcasting program is recorded onto a video tape in the method shown in FIGS. 17 and 18, the normal speed playback of the recorded tape is as shown in FIG. 19 and the variable speed playback is as shown in FIG. 20.

In other words, as shown in FIG. 19, during the normal speed playback, the scrambled data region where the scrambled data SD is recorded is all reproduced and the descrambling information region where the ECM or CW is recorded is reproduced whenever the ECM or CW is changed, so that the video data obtained by multiplexing the scrambled data SD and the ECM or CW is output to the DVCR.

Also, during the variable speed playback, a super-high speed playback is performed in the fast forward block without reproducing the recorded data. The scrambled data region where the scrambled data SD is recorded is all reproduced and the first detected ECM or CW is reproduced. Thereafter, whenever the ECM or CW is changed, the descrambling information region where the ECM or CW is recorded is once reproduced, so that the video data obtained by multiplexing the scrambled data SD and the ECM or CW is output to the DVCR.

At this time, in case when the ECM is recorded in the descrambling information region, the descrambling disable region becomes relatively larger by the time delay for restoring the CW through the process for the decryption of the ECM. In case when the CW is recorded in the descrambling information region, the descrambling disable region becomes relatively smaller as there is no time delay due to decryption.

In the process of converting from the fast forward block into the normal speed playback block, the error probability of the reproduced data becomes larger, so that the ECM or CW may be detected erroneously. Therefore, the ECM or CW is repeatedly recorded in the descrambling information region, thereby allowing additional error correction.

As described above, the recording method of the digital magnetic recording medium for copyright protection and variable speed playback according to the present invention has the following advantages.

First, in order to remove or minimize the lowering of the performance in the variable speed playback, the scrambled data is recorded onto a video tape, errors are corrected accordingly and the video data is transmitted from a DVCR to a decoder or another DVCR.

Second, when a user records the broadcasting program scrambled for a conditional access onto a video tape for the purpose of the time shift, the lowering of the performance in the variable speed playback can be removed or minimized.

Third, a satisfactory variable speed playback performance can be allowed in the video tape to which a program copyright protection function is adopted.

Fourth, in case of being adopted with a proper copyright protection system, the copyright of the program provider can be protected, and the lowering of the performance is also minimized during the user's variable speed playback of the video tape to which the copyright protection function is adopted, thereby satisfying both the program provider and the user.

What is claimed is:

1. A recording method of a digital magnetic recording medium for copyright protection and variable speed playback wherein a video track of a video tape is separated into a scrambled data region, where scrambled data is recorded, and a descrambling region, where descrambling information for descrambling scrambled data is recorded;

wherein said descrambling information is contained and encrypted in an entitlement control message (ECM), said ECM being recorded in a descrambling information region of another track ahead of the video track where said scrambled data is recorded corresponding to the time needed for decrypting said ECM.

2. A recording method of digital magnetic recording medium as claimed in claim 1, wherein said scrambled data is scrambled depending on a scrambled information corresponding to a scrambled block separated by a cycle during which the scrambled information is initialized during scrambling.

3. A recording method of a digital magnetic recording medium as claimed in claim 2, wherein the size of said scrambled data is a constant number of times said scrambled data of one track of said video tape.

4. A recording method of a digital magnetic recording medium as claimed in claim 1, wherein said ECM is repeatedly recorded depending on a quantity of tracks corresponding to a scrambled block.

5. A recording method of a digital magnetic recording medium claimed in claim 1, wherein said ECM is recorded once in one track among a plurality of tracks corresponding to a scrambled block.

6. A recording method of a digital magnetic recording medium for copyright protection and variable speed playback wherein a video track of a video tape is separated into a scrambled data region, where scrambled data is recorded, and a descrambling region, where descrambling information for descrambling scrambled data is recorded;

wherein said descrambling information which is recorded is encrypted and said descrambling information is recorded ahead of corresponding scrambled data by a number of tracks corresponding to the time needed for decryption of said descrambling information for the video track where said scrambled data is recorded for descrambling the corresponding scrambled data.

7. A recording method of a digital magnetic recording medium as claimed in claim 16, wherein said descrambling information is repeatedly recorded depending on a quantity of tracks corresponding to a scrambled block.

8. A recording method of a digital magnetic recording medium as claimed in claim 7, wherein said descrambling information is varied depending on said scrambled block.

9. A recording method of a digital magnetic recording medium as claimed in claim 8, wherein said descrambling information is varied in a constant time interval depending on said scrambled block.

10. A recording method of a digital magnetic recording medium as claimed in claim 9, wherein said descrambling information is recorded ahead by a constant number of tracks of the track where said scrambled data is recorded for descrambling the corresponding scrambled data.

11. A recording method of a digital magnetic recording medium as claimed in claim 10, wherein said descrambling information is recorded ahead by one track of the track where said scrambled data is recorded for descrambling the corresponding scrambled data.

12. A recording method of a digital magnetic recording medium as claimed in claim 7, wherein a parity is recorded for error correction of said scrambled data by adding a parity region for recording said parity within the video track of said video tape.

13. A recording method of a digital magnetic recording medium as claimed in claim 12, wherein said scrambled data region and said parity region are repeatedly separated and recorded in said video track.

14. A recording method of a digital magnetic recording medium for copyright protection and variable speed playback wherein a video track of a video tape is separated into a scrambled data region, where scrambled data is recorded, and a descrambling region, where descrambling information for descrambling said scrambled data is recorded;

wherein a parity is recorded for error correction of said descrambling information by adding a parity region for recording said parity in the video track of said video tape, said scrambled data region, descrambling information region and parity region are repeatedly separated and recorded within said video track, and the same parity for error correction as that of said scrambled data is added to said descrambling information.

15. A recording method of a digital magnetic recording medium as claimed in claim 14, wherein said scrambled data is transmitted in a bit stream unit.

16. A recording method of a digital magnetic recording medium as claimed in claim 14, wherein said descrambling information is recorded in the portion corresponding to a synchronizing byte present in a bit stream of said transmitted scrambled data.

17. A recording method of a digital magnetic recording medium for copyright protection and variable speed playback wherein a video track of a video tape is separated into a scrambled data region, where scrambled data is recorded, and a descrambling region, where descrambling information for descrambling said scrambled data is recorded;

wherein a parity of said descrambling information is recorded for error correction of said descrambling information by adding a descrambling parity region for recording said parity of said descrambling information within the video track of said video tape, a parity of said scrambled data is recorded for error correction of said scrambled data by adding a scrambled parity region for recording said parity of said scrambled data within the video track of said video tape, and said parity of said scrambled data is different than said parity added to said descrambling information for error correction thereof.

18. A recording method of digital magnetic recording medium as claimed in claim 7, wherein said scrambled data region and said parity region thereof are repeatedly separated and recorded within said video track.

19. A recording method of digital magnetic recording medium as claimed in claim 18, wherein said descrambling information region and said parity region thereof are separately recorded within said video track.

* * * * *